(12) United States Patent
Kimmel et al.

(10) Patent No.: US 7,449,207 B2
(45) Date of Patent: Nov. 11, 2008

(54) METHOD FOR PROCESSING TOMATOES FOR THE PRODUCTION OF CHUNK TOMATO PRODUCTS

(75) Inventors: Mark Kimmel, Modesto, CA (US);
Larry Koppes, Vancouver, WA (US);
Tuan Nguyen, Danville, KY (US);
Brandon Tulley, Fort Thomas, KY (US);
Eric Franzoi, Pasadena, MD (US)

(73) Assignee: Stanislaos Food Products, Modesto, CA (US)

( * ) Notice: Subject to any disclaimer, the term of this patent is extended or adjusted under 35 U.S.C. 154(b) by 0 days.

(21) Appl. No.: 11/027,499

(22) Filed: Dec. 29, 2004

(65) Prior Publication Data

US 2006/0141113 A1      Jun. 29, 2006

(51) Int. Cl.
*A23L 1/212*      (2006.01)
(52) U.S. Cl. .................. 426/481; 426/489; 426/495; 426/599
(58) Field of Classification Search ............... 426/481, 426/489, 495, 599
See application file for complete search history.

(56) References Cited

U.S. PATENT DOCUMENTS

| 3,404,012 | A | * | 10/1968 | Craig | 426/384 |
| 4,095,517 | A | * | 6/1978 | Janovtchik | 99/495 |
| 5,035,909 | A | * | 7/1991 | Lomelin et al. | 426/473 |
| 5,837,311 | A | * | 11/1998 | Zelkha et al. | 426/651 |
| 2004/0194634 | A1 | * | 10/2004 | Succar et al. | 99/324 |

FOREIGN PATENT DOCUMENTS

| EP | 570953 | * | 11/1993 |
| EP | 884002 | * | 12/1998 |
| JP | 06-46806 | * | 2/1994 |

* cited by examiner

*Primary Examiner*—Anthony Weier
(74) *Attorney, Agent, or Firm*—Paul Davis; Goodwin Procter LLP

(57) ABSTRACT

A method of making chunk tomato pieces from tomatoes. The tomatoes are introduced into a tomato preparation system where they are cleaned, de-stemmed, peeled and chopped. This creates a mixture of tomato chucks, seeds and juice. The tomato chunks are separated from the seeds and juice. The juice is separated from the seeds and subsequently added back to the chunks in proper proportions.

22 Claims, 4 Drawing Sheets

METHOD FOR PROCESSING TOMATOES FOR THE PRODUCTION OF CHUNK TOMATO PRODUCTS

BACKGROUND OF THE INVENTION

1. Field of the Invention

This invention relates generally to methods and systems for processing tomatoes, and more particular to methods and systems for processing tomato for the production of chunk products.

2. Description of the Related Art

Tomato processing for production of a chunk tomato product verses juice production is currently and has historically utilized a variety of different steps, including but limited to, peeling, cutting/chopping, thermal procedures, and packaging with seeds. Seeds are known to produce off flavors and are visually non-appealing to the end consumer. Over the years numerous attempts have been made to remove seeds from chunks after cutting. All attempts have been unsuccessful.

With current methods of tomato processing, tomato essence is retained in the juice that is liberated during the cutting/chopping step. The tomato essence must be retained during the deseeding processes. However, methods employed to date to deseed reduce the amount of tomato essence. To be cost effective in the tomato industry mass flows are very high. Methods to date that have attempted to deseed have had a negative impact on the flow rate. Additionally, tomatoes are very sensitive to the introduction of unnecessary shear. Shear reduces product size and liberates excessive juice and tomato essence. Methods utilized to date for deseeding have not proven to be successful because they impact tomato product desirability, and reduce tomato essence.

There is a need for improved methods and systems for producing seedless chunk tomato products. There is a further need for methods and systems for producing seedless chunk tomato products without effecting flow of product. There is yet another need for methods and systems for producing seedless chunk tomato products while preserving tomato essence and without introducing shear.

SUMMARY OF THE INVENTION

An object of the present invention is to provide improved methods and systems for processing tomatoes.

Another object of the present invention is to provide methods and systems for making chunks of tomatoes from tomatoes.

Yet another object of the present invention is to provide methods and systems for the removal of seeds from tomatoes during processing of tomatoes into tomato chunks.

A further object of the present invention is to provide methods and systems for producing tomato chunks while preserving tomato essence.

Another object of the present invention is to provide methods and systems for making deseeded chunks of tomatoes from tomatoes during a continuous process.

A further object of the present invention is to provide methods and systems for making deseeded chunks of tomatoes from tomatoes with minimal impact on the size and shape of the tomato chunks.

Yet another object of the present invention is to provide methods and systems for making deseeded chunks of tomatoes from tomatoes with a seed removal of at least 90%.

Another object of the present invention is to provide methods and systems for making deseeded chunks of tomatoes from tomatoes with an optimal balance of juice and chunks.

These and other objects of the present invention are achieved in a method of making chunk tomato pieces from tomatoes. The tomatoes are introduced into a tomato preparation system where they are cleaned, de-stemmed, peeled and chopped. This creates a mixture of tomato chucks, seeds and juice. The tomato chunks are separated from the seeds and juice. The juice is separated from the seeds and subsequently added back to the chunks in proper proportions.

In another embodiment of the present invention, a system is provided for making chunk tomato pieces from tomatoes. A preparation device includes a holding space for receiving tomatoes and a device to peel and de-stem tomatoes. A processing unit is coupled to the preparation device. The processing unit produces a mixture of tomato seeds, tomato juice, pulp and chunks. A separation device is coupled to the processing unit that removes the seeds from the tomato juice, chunks and pulp. A receiving device is coupled to the separation device.

DETAILED DESCRIPTION OF THE PREFERRED EMBODIMENTS

Figure 1:
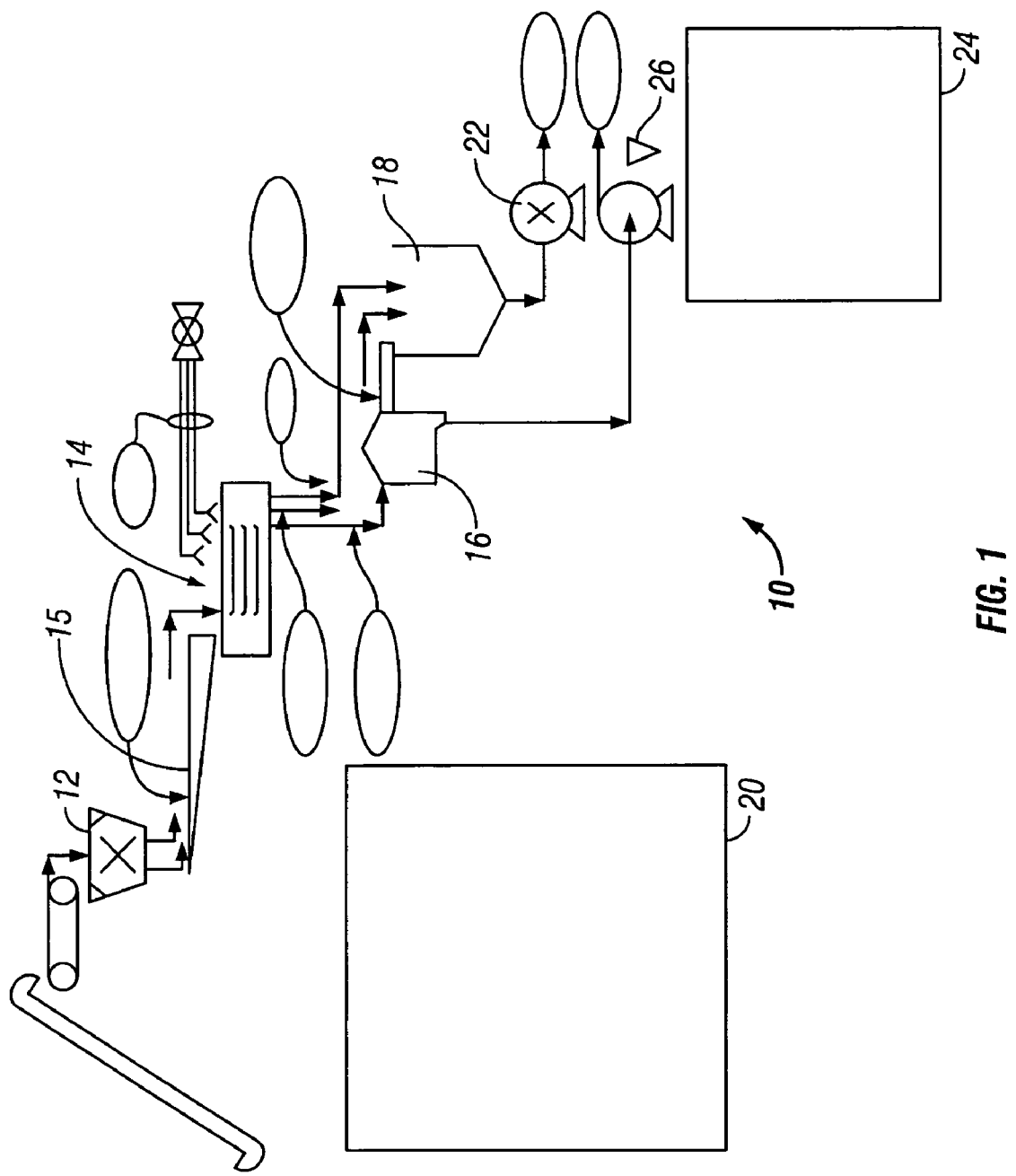
FIG. 1 illustrates one embodiment of a system of the present invention for making chunk tomato pieces from tomatoes.

Referring to FIGS. 1 through 4, in one embodiment of the present invention, methods and systems are provided for making chunk tomato pieces from tomatoes. A processing system 10 includes a device 12 for receiving whole and/or partially crushed tomatoes, hereafter generally referred to as the "received tomato".

Processing system 10 peels, de-stems and then sends the received tomatoes to a maceration processing unit 14. Maceration begins with the transport of the received tomatoes to various feed conveyors, generally denoted as 15, including but not limited to surge bins.

The received tomatoes are continuously feed into maceration processing unit 14 by the conveyors 15. Feeding of the received tomatoes can be achieved in a variety of different manners, including but not limited to dropping the received tomatoes into maceration processing unit 14 in feed, and the like. Maceration occurs when the received tomatoes are exposed to a continuously moving cutting device. The cutting device reduces received tomato mass into chunks. Cutting device can also slice and/or dice, e.g., cube, the received tomatoes.

Generally, maceration processing unit 14 produces tomato chunks, seeds and tomato juice. This mixture is then strained at a separating device 16 that removes the seeds and recycles the juice, chunks and pulp. The recycled juice, chunks pulp are then received at a receiving unit 18 and a suitable separating device 16 is employed.

Figure 2:
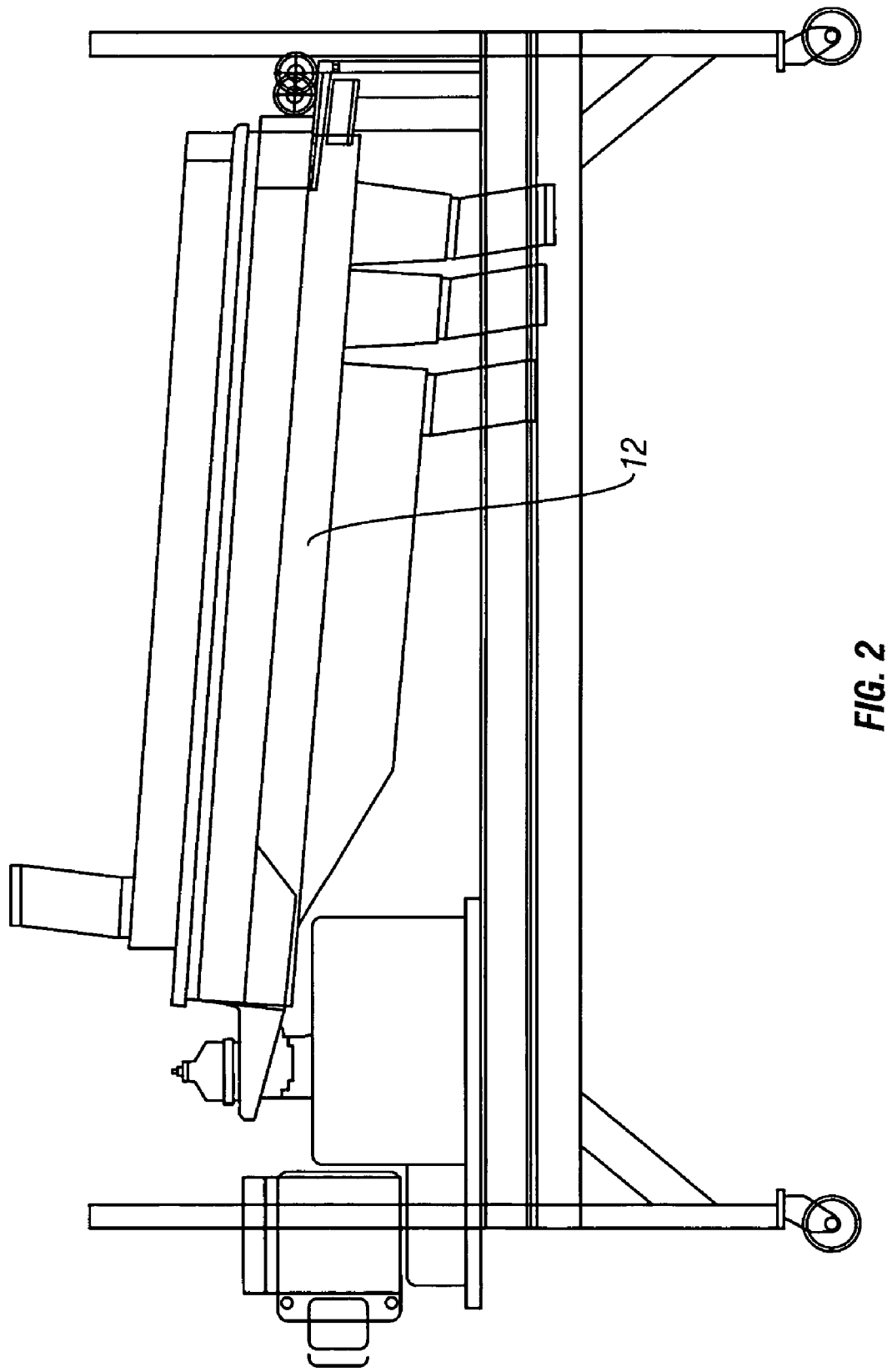
FIGS. 2 and 3 illustrate embodiments of feed conveyors useful for the transport of the received tomatoes.
Figure 3:
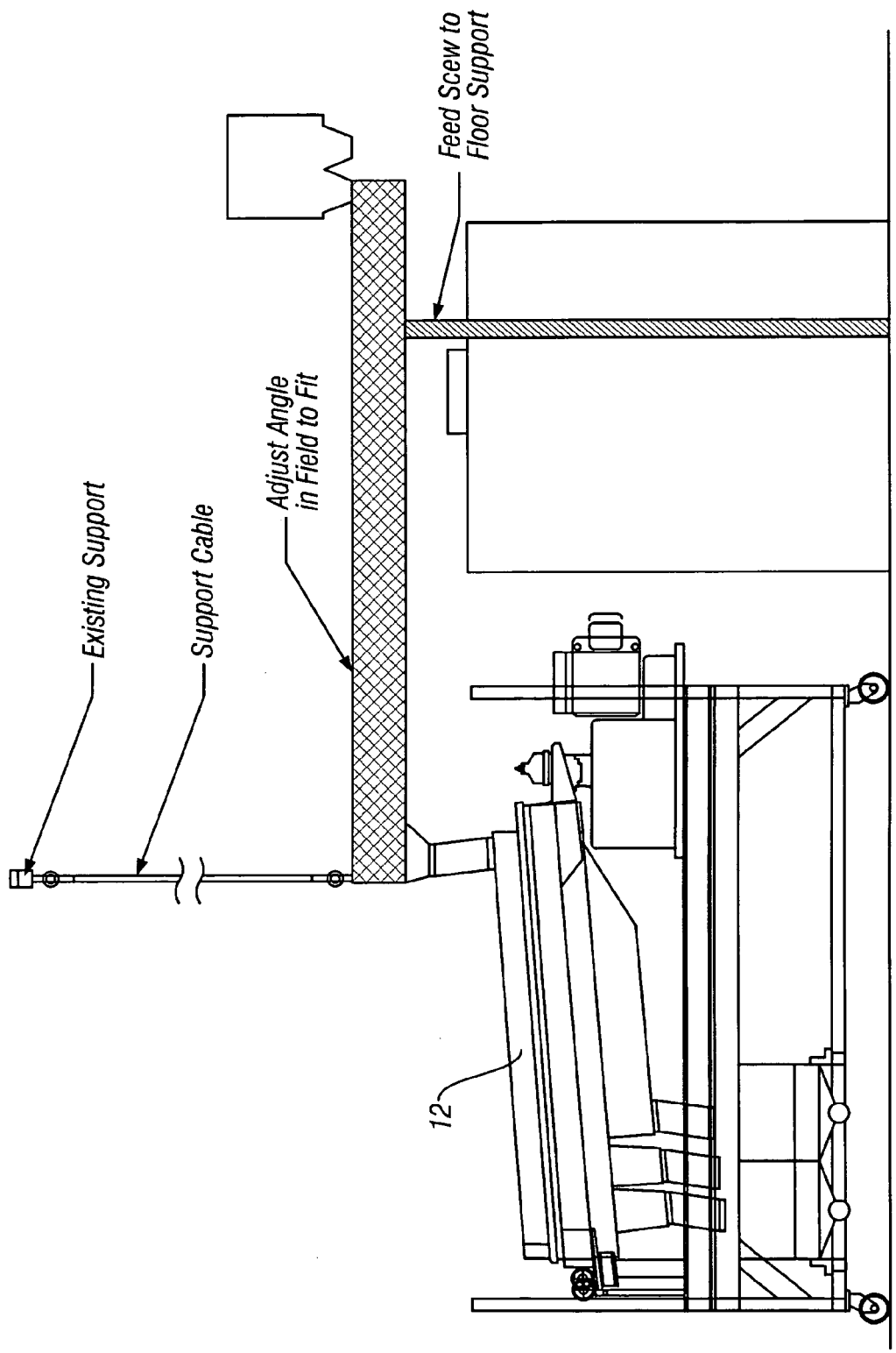
Figure 4:
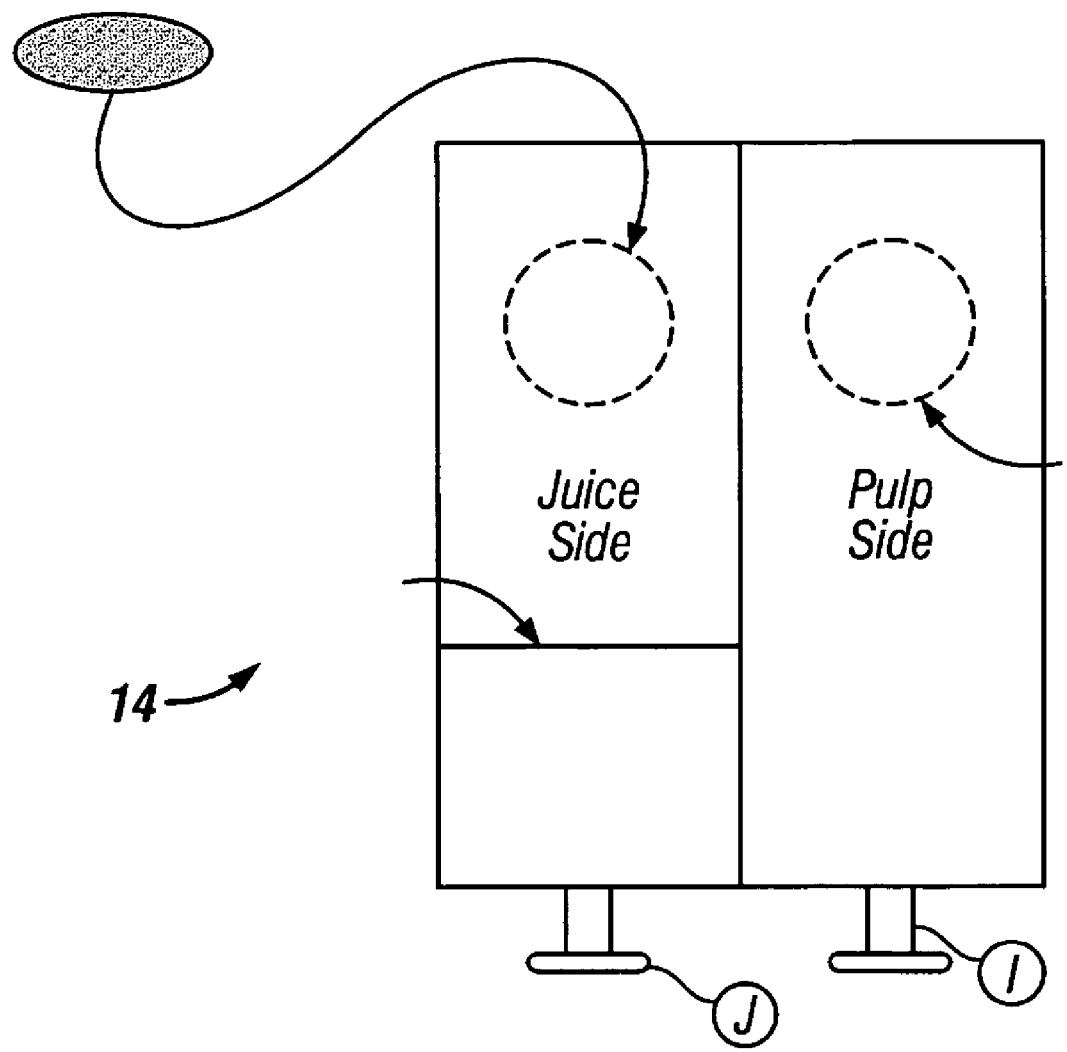
FIG. 4 is a cross-sectional view of one embodiment of a a maceration processing unit of the present invention.

In another embodiment, illustrated in FIG. 2, the seeds are removed in the straining process and the remaining material is received at a high speed centrifugation device 20. At centrifugation device 20 puree is further processed in order to create tomato paste. The remaining tomato chunks are then received at receiving unit 18. In one embodiment, a Liquatex separator is utilized, which is commercially available from Rotex Inc., Cincinnati, Ohio.

In various embodiments, the flow of chunks is diluted with tomato juice in order to create a diluted mass of chunks. The tomato juice can be received from processing apparatus 10. The diluted mass of chunks can be passed across a rotex. The diluted mass of chunks can be sprayed with tomato juice. The spray can be delivered in the form of a water fall of tomato juice that cascades over the chunks.

In one embodiment, the seeds, chunks and tomato juice are separated into three flows. The tomato juice can flow in a closed-loop system. At least a portion of the tomato juice that is separated from the chunks flows in a return path to spray the chunk and seed mixture. The tomato juice flows in a closed-loop pumping circuit within processing apparatus 10. The closed-loop pumping circuit 22 can include a tomato juice reservoir 24 which can be pre-charged.

Tomato juice can then flow from tomato juice reservoir 24 to a spray nozzle 26 that sprays the tomato chunks with tomato juice. Tomato juice reservoir 24 is filled with tomato juice prior to chopping the tomatoes. An equilibrium is created between the spray and the tomato juice reservoir. A tomato juice and tomato chunk balance without seeds is created.

In one embodiment, the balance is in the range of 85% 60% tomato juice and 15%-40% tomato chunk. In another embodiment, the balance is about 75% tomato juice 25% tomato chunk. With certain embodiments of the present invention, methods and systems are provided for making deseeded chunks of tomatoes from tomatoes during a continuous process while maintaining a commercial rate of flow and with minimal impact on the size and shape of the tomato chunks. In one embodiment, the methods and systems of the present invention for a seed removal of at least 90%, at least 95% and at least 99%.\

EXAMPLE 1

In this example, apparatus 10 was utilized to separate tomato chunks from seeds. A modified Rotex unit, with liquid recirculation and a feed system was utilized. Four tests were performed. Tests were initiated with recovered and reconstituted juice. Testing occurred for a total of 61 minutes. Reject stream (seeds, juice and residual juice) was analyzed via placement on punch plate screen with 0.090" openings. This allowed liquid (as compared to seeds and pectin) to drip free.

Visually acquired data indicated significant reduction of seeds in finished product, as evidenced by the pulp feed and finished product. There was no discernable change in flavor profile pectin. Seed content of rejected stream was high with liquid reasonable low of about 1% of line flow on a mass basis. Pectin and seed were approximately 9 to 10% of total mass flow The actual total mass flow was 12,200 pounds for 61 minutes. Liquid reintroduction to pulp was successful with stationary weir functioning. Post test inspection revealed little if any build up on screen surfaces Table 1 summarizes the results.

TABLE 1

| Test#. | Mass Flow lbs/hr Equiv | Spray Bars Used | Auger Deluge Used + Flow | Recirculation pump Rate in Hz | Recirculation pump pressue | Observations | |
|---|---|---|---|---|---|---|---|
| | | | | | | | Sep. 15, 2003 |
| Set Up | | 1, 2 & 3 | | 41.51 | | Initial start up juice is heat treated: 120 deg F. @ 9 brix Dilute to 4.5 Juice at approx. 100 deg F. Tomatoes at approximately 100 deg F. Operated 10 minutes without product: 4.2 lbs juice in seed discharge | |
| 1 | Est. 50% Lineflow | 1 & 2 | | 41.51 | | Start Time is 8:09 AM Seeds, Pectin and Juice: 25.3 pounds in 1' 15" Visible reduction of seeds in pulp is very significant Pulp side tank must be modified to greater slope Decanting wier works amazingly well. | |
| 2 | 15823 | 1 & 2 | Valve @ 50% | 41.51 | | Seeds, Pectin and Juice: 25.3 pounds in 1' 01" 203 cans in 4' 20" . . . 90 ozs tomatoes/can or 5.625 pounds/can Seed removal improved | % lineflow 10% |
| 3 | 13950 | 1 | Valve @ 50% | 41.51 | | Seeds, Pectin and Juice: 24.6 pounds in 1' 09" 40 second 15.2 pounds total mass 13.8 pounds seeds and pectin 1.4 pounds juice Some increase in seeds in pulp 124 cans in 3' 00" | 9% 10% 9% 1% |

TABLE 1-continued

| Test#. | Mass Flow lbs/hr Equiv | Spray Bars Used | Auger Deluge Used + Flow | Recirculation pump Rate in Hz | Recirculation pump pressue | Observations | |
|---|---|---|---|---|---|---|---|
| 4 | 13900 | 1 & 2 | Valve @ 50% | 41.51 | | Seeds, Pectin and Juice: | |
| | | | | | | 40 second 17.5 pounds total mass | 11% |
| | | | | | | 15.6 pounds seeds and pectin | 10% |
| | | | | | | 1.6 pounds juice | 1% |
| | | | | | | End Test 9:10 | |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making deseeded chunk tomato pieces from tomatoes, comprising:
   introducing the tomatoes into a tomato preparation system where they are cleaned, de-stemmed, peeled and chopped;
   creating a mixture comprising tomato chunks, seeds, pulp and tomato juice;
   removing said seeds from the created mixture of tomato chunks, pulp and tomato juice and thus creating a mixture of tomato chunks, pulp and tomato juice without seeds;
   separating from said mixture of tomato chunks, pulp and tomato juice without seeds the tomato chunks and tomato juice wherein same are separated into a tomato chunk flow and a tomato juice flow;
   said tomato chunk flow thus providing said deseeded tomato chunks.

2. The method of claim 1, further comprising:
   diluting the deseeded tomato chunks with tomato juice that has been separated from the seeds to create a diluted mass of deseeded tomato chunks.

3. The method of claim 2, wherein the diluted mass of deseeded tomato chunks is run across a screener.

4. The method of claim 3, wherein the screen is a rotex.

5. The method of claim 3, further comprising:
   spraying the diluted mass of deseeded tomato chunks with tomato juice.

6. The method of claim 5, wherein the spraying is delivered in the form of at least one of a water fall or induced spray of tomato juice that delivers tomato juice over the deseeded tomato chunks.

7. The method of claim 1, further comprising:
   separating the seeds, tomato chunks and tomato juice mixture into three flows.

8. The method of claim 1, wherein the tomato juice flows in a closed-loop system.

9. The method of claim 8, wherein at least a portion of the tomato juice separated from the tomato chunks and seeds flows in a return path to spray a tomato chunk and seed mixture before the seeds are separated.

10. The method of claim 9, wherein the tomato juice flows in a closed-loop pumping circuit.

11. The method of claim 9, wherein the closed-loop pumping circuit includes a tomato juice reservoir.

12. The method of claim 11, further comprising:
    pre-charging the tomato juice reservoir.

13. The method of claim 12, wherein tomato juice flows from the tomato juice reservoir to a spray nozzle that sprays the tomato chunks.

14. The method of claim 12, wherein tomato juice flows from the tomato juice reservoir to a deluge unit that sprays the tomato chunks.

15. The method of claim 12, wherein tomato juice flows from the tomato juice reservoir to a water fall unit that sprays the tomato chunks.

16. The method of claim 12, wherein an equilibrium is created between the spray and the tomato juice reservoir.

17. The method of claim 16, further comprising:
    utilizing a decanting flume to separate seeds and pectin from the tomato juice.

18. The method of claim 2, wherein a balance is created of tomato juice and tomato chunks without seeds following the step of separating the tomato juice from the seeds.

19. The method of claim 18, wherein the balance is the range of 85% 60% tomato juice 15% -4% tomato chunk.

20. The method of claim 18, wherein the balance is about 75% tomato juice 25% tomato chunk.

21. The method of claim 11, wherein the tomato juice reservoir is filled with tomato juice prior to chopping the tomatoes.

22. The method of claim 11, wherein tomato juice flows continuously through the closed-loop system.

* * * * *